(12) United States Patent
Li et al.

(10) Patent No.: US 10,814,283 B1
(45) Date of Patent: Oct. 27, 2020

(54) FILTER DEVICE AND WASHING METHOD THEREFOR

(71) Applicant: A.O. SMITH (NANJING) WATER TREATMENT PRODUCTS CO., LTD., Nanjing (CN)

(72) Inventors: Kui Li, Shanghai (CN); Shunyong Li, Shanghai (CN); Chen Wang, Shanghai (CN); Yan Huang, Shanghai (CN)

(73) Assignee: A.O.SMITH (CHINA) WATER TREATMENT PRODUCTS CO., LTD., Nanjing (CN)

( * ) Notice: Subject to any disclaimer, the term of this patent is extended or adjusted under 35 U.S.C. 154(b) by 6 days.

(21) Appl. No.: 15/573,232

(22) PCT Filed: Jun. 2, 2015

(86) PCT No.: PCT/CN2015/080564
§ 371 (c)(1),
(2) Date: Nov. 10, 2017

(87) PCT Pub. No.: WO2016/179863
PCT Pub. Date: Nov. 17, 2016

(30) Foreign Application Priority Data

May 11, 2015 (CN) .......................... 2015 1 0235774

(51) Int. Cl.
*B01D 65/02* (2006.01)
*B01D 61/02* (2006.01)
(Continued)

(52) U.S. Cl.
CPC ........... *B01D 65/02* (2013.01); *B01D 61/025* (2013.01); *B01D 63/10* (2013.01); *C02F 1/441* (2013.01);
(Continued)

(58) Field of Classification Search
CPC ........ B01D 65/02; B01D 61/20; B01D 61/18; B01D 2321/164; B01D 2321/162;
(Continued)

(56) References Cited

U.S. PATENT DOCUMENTS 3,776,530 A * 12/1973 Griffith ................. B01D 61/44
204/630
5,733,434 A * 3/1998 Harada ............. H01L 21/02052
134/1.3
(Continued)

FOREIGN PATENT DOCUMENTS

CN 2278690 Y 4/1998
CN 103083697 A 5/2013
(Continued)

OTHER PUBLICATIONS

International Search Report and Written Opinion for Application No. PCT/CN2015/080564 dated Feb. 18, 2016 (17 pages, English translation included).
(Continued)

*Primary Examiner* — Claire A Norris
*Assistant Examiner* — Ekandra S. Miller-Cruz
(74) *Attorney, Agent, or Firm* — Michael Best & Friedrich LLP

(57) ABSTRACT

Provided are a filter device and a washing method therefor. The filter device comprises a membrane housing (1); a spacer (2) having an ion transmittance and separating the membrane housing (1) into a first chamber (11) and a second chamber (12); a membrane element (6) disposed in the first chamber (11); a first electrode (4) disposed in the first chamber (11); and a second electrode (5) disposed in the second chamber (12). The method comprises respectively connecting a positive electrode and a negative electrode to the first electrode (4) and the second electrode (5), such that
(Continued)

the first electrode (4) and the second electrode (5), water in the first chamber (11) and water in the second chamber (12) form an electrolytic cell, thus generating acidic water or alkaline water in the first chamber (11). The acidic water and/or the alkaline water are/is used for washing the member element.

29 Claims, 7 Drawing Sheets

(51) Int. Cl.
    *B01D 63/10*     (2006.01)
    *C02F 1/44*     (2006.01)
    *C02F 1/461*     (2006.01)

(52) U.S. Cl.
    CPC ...... *C02F 1/4618* (2013.01); *B01D 2321/162* (2013.01); *B01D 2321/164* (2013.01); *C02F 2201/4617* (2013.01); *C02F 2209/40* (2013.01); *C02F 2303/16* (2013.01)

(58) Field of Classification Search
    CPC ............ B01D 2321/16; B01D 2321/04; B01D 2317/04; B01D 29/904; B01D 35/22; B01D 35/30; B01D 61/02; B01D 61/025; B01D 61/08; B01D 61/10; B01D 61/14; B01D 61/00; B01D 63/02; B01D 63/06; B01D 63/08; B01D 63/10; B01D 2201/16; B01D 2201/165; B01D 2311/2692; B01D 2313/105; B01D 2313/13; B01D 65/022; B01D 65/027; B01D 65/06; B01D 63/04; B01D 2321/20; B01D 2321/168; B01D 2311/13; C02F 1/444; C02F 2303/16; C02F 1/44; C02F 1/441

USPC ....... 210/195.2, 321.69, 501, 636, 650, 652, 210/321.72, 321.78, 321.79
See application file for complete search history.

(56) References Cited

U.S. PATENT DOCUMENTS

| | | | | |
|---|---|---|---|---|
| 6,733,675 B2 * | 5/2004 | Ando | ................. | B01D 61/142 |
| | | | | 210/321.74 |
| 2007/0108056 A1 * | 5/2007 | Nyberg | ............... | C02F 1/46109 |
| | | | | 204/554 |
| 2010/0200425 A1 * | 8/2010 | Arai | ....................... | B01D 61/44 |
| | | | | 205/742 |
| 2011/0120870 A1 * | 5/2011 | Kruger | ................ | B01D 61/022 |
| | | | | 204/518 |
| 2013/0341264 A1 * | 12/2013 | Kidwell | ............... | B01D 63/103 |
| | | | | 210/321.83 |

FOREIGN PATENT DOCUMENTS

| | | | | |
|---|---|---|---|---|
| CN | 104084048 A | | 10/2014 | |
| CN | 104096483 A | | 10/2014 | |
| CN | 204058142 U | | 12/2014 | |
| CN | 204107340 U | | 1/2015 | |
| CN | 204159229 U | | 2/2015 | |
| CN | 104671536 A | | 6/2015 | |
| CN | 204661443 U | | 9/2015 | |
| JP | 6182346 A | * | 6/1994 | ............ B01D 61/44 |
| JP | H06182346 A | | 7/1994 | |
| JP | 10071393 A | * | 3/1998 | ................ C02F 1/46 |
| WO | WO-2014119762 A1 | * | 7/2014 | ................ C02F 1/46 |

OTHER PUBLICATIONS

Chinese Patent Office Action and Search Report for Application No. 201510235774.7 dated Sep. 26, 2019 (9 pages, English translation included).

* cited by examiner

FILTER DEVICE AND WASHING METHOD THEREFOR

TECHNICAL FIELD

The present disclosure relates to purifying equipment, and in particular, to a filter device and a washing method therefor.

BACKGROUND ART

In the prior art, a filter device provided with a reverse osmosis membrane is usually used to filter a water source so as to remove heavy metals, microorganisms, ions, etc. in the water source, thus obtaining pure water. The currently existing reverse osmosis membrane elements mainly achieve the purpose of pure water preparation where the reverse osmosis membranes are under a certain pressure. Chinese patent applications such as patent documents CN201510051209.5 and CN201410384072.0 disclose similar membrane elements and water treatment devices. In the actual process of treating a water source with a reverse osmosis membrane element, it was found that organic salt foulants and/or inorganic salt foulants were prone to be generated in the reverse osmosis membrane element, so that a secondary pollution can be easily caused, and the service life of the reverse osmosis membrane element will also be reduced.

SUMMARY OF THE INVENTION

In order to overcome the above defects of the prior art, the technical problem to be solved by the present disclosure is to provide a filter device and a washing method therefor, which can wash a reverse osmosis membrane element and remove foulants therein.

The specific technical solutions of the present disclosure are as follows.

A filter device comprises: a membrane housing; a spacer having an ion transmittance, the spacer separating the membrane housing into a first chamber and a second chamber; a membrane element disposed in the first chamber; a first electrode disposed in the first chamber; and a second electrode disposed in the second chamber.

Preferably, the first electrode and the second electrode are connected to two electrodes of a power supply, respectively; and when the first chamber and the second chamber are filled with water, an electrolytic cell is formed between the first electrode and the second electrode.

Preferably, the spacer comprises a support provided therein with a through hole and a membrane for blocking the through hole, the membrane having the ion transmittance.

Preferably, the support is in a sleeve shape, and the membrane is wound inside or outside the support.

Preferably, the first electrode is disposed on an inner surface of the support.

Preferably, the second electrode is disposed on an outer surface of the support.

Preferably, the membrane comprises one or more of an ultrafiltration membrane, a nanofiltration membrane, a reverse osmosis membrane, an ion exchange membrane, and a bipolar membrane.

Preferably, the filter device has a washing state in which the first electrode and the second electrode are connected to positive and negative electrodes of a direct current power supply, respectively, such that water within the first chamber is acidic or alkaline.

Preferably, the filter device has an acid washing state in which the first electrode is connected to the positive electrode of the direct current power supply, and the second electrode is connected to the negative electrode thereof.

Preferably, when the filter device is in the acid washing state, water within the first chamber has a pH value of 1 to 4.

Preferably, the filter device has an alkaline washing state in which the first electrode is connected to the negative electrode of the direct current power supply, and the second electrode is connected to the positive electrode thereof.

Preferably, when the filter device is in the alkaline washing state, water within the first chamber has a pH value of 9 to 13.

Preferably, the filter device has an acid washing state and an alkaline washing state that take place in the alternative manner, wherein when the filter device is in the acid washing state, the first electrode is connected to the positive electrode of the direct current power supply, and the second electrode is connected to the negative electrode thereof; when the filter device in the alkaline washing state, the first electrode is connected to the negative electrode of the direct current power supply, and the second electrode is connected to the positive electrode thereof.

Preferably, when the filter device is in the washing state, a breakover current between the first electrode and the second electrode is 0 to 3 A.

Preferably, when the filter is in the washing state, the direct current power supply has a voltage of 0 to 36 V.

Preferably, the membrane element has a water inlet in communication with the first chamber and a wastewater outlet in communication with the second chamber, the first chamber being in communication with a water source and the second chamber being in communication with a drain line.

Preferably, the wastewater outlet of the membrane element is provided with a flow rate control device that have at least a filtration flow rate state and a washing flow rate state, a filtration flow rate being larger than a washing flow rate, and wherein when the filter device is in a filtering state, the flow rate control device is in the filtration flow rate state, and when the filter device is in the washing state, the flow rate control device in the washing flow rate state.

Preferably, the second chamber has a water outlet in communication with the flow rate control device.

Preferably, the flow rate control device comprises first and second throttling devices in communication with the wastewater outlet of the membrane element and connected in parallel with each other, a flow rate of the first throttling device being the filtration flow rate and a flow rate of the second throttling device being the washing flow rate.

Preferably, the filter device further comprises means for opening and closing the wastewater outlet.

Preferably, the membrane element is a rolled reverse osmosis membrane, the water inlet of the membrane element is located on a side surface of the membrane element, and the wastewater outlet of the membrane element is located at an end surface of the membrane element.

Preferably, the wastewater outlet of the membrane element is located adjacent to a water collecting pipe of the membrane element.

The present disclosure further discloses a method for washing a filter device, comprising:
connecting positive and negative electrodes of a direct current power supply to a first electrode located within a first chamber and a second electrode located within a second chamber, respectively, such that the first and second electrodes located on opposite sides of a spacer, water within the first chamber, and water within the second chamber form an electrolytic cell, whereby acid water or alkaline water is electrolytically generated within the first chamber.

Preferably, the washing method comprises: electrically connecting the first electrode with the positive electrode of the direct current power supply, and electrically connecting the second electrode with the negative electrode thereof, such that acidic liquid is formed within the first chamber.

Preferably, the washing method comprises: electrically connecting the first electrode with the negative electrode of the direct current power supply, and electrically connecting the second electrode with the positive electrode thereof, such that alkaline liquid is formed within the first chamber.

Preferably, the washing method comprises: electrically connecting the first electrode with the negative electrode of the direct current power supply, and electrically connecting the second electrode with the positive electrode thereof, such that alkaline liquid is formed within the first chamber;

electrically connecting the first electrode with the positive electrode of the direct current power supply, and electrically connecting the second electrode with the negative electrode thereof, such that acidic liquid is formed within the first chamber.

Preferably, the washing method comprises: closing a water pump in communication with the first chamber.

Preferably, the washing method comprises: communicating a water inlet of the filter device with a water source, and connecting a water outlet of the filter device to a drain line.

Preferably, the washing method comprises: reducing a flow rate of water within the filter device by a flow rate control device in communication with the wastewater outlet of the membrane element.

With the above structure and method, the present disclosure has advantages as follows:

1. The filter device can wash the membrane element with acid water and/or alkaline water, whereby the acid washing can remove inorganic salt foulants in the reverse osmosis membrane element, while the alkaline washing can remove organic salt foulants therein.

2. The filter device can control the time for water to pass through the membrane element through a flow rate control device and a water pump, so as to completely wash the foulants; meanwhile, water flows in radially from the reverse osmosis membrane in the present disclosure, whereby acid washing water or alkaline washing water can flow circuitously within the whole raw water flow channel during washing, and thus a large membrane surface area is covered and the whole raw water flow channel is washed thoroughly, which solves the problem that the middle area of the reverse osmosis membrane cannot be washed when water flows in from either end of the reverse osmosis membrane. The filter device enables acid water/alkaline water to enter the membrane element from the water inlet of the membrane element, dissolve the organic/inorganic salt foulants on the membrane surface, and then flow out of the wastewater outlet of the membrane element, such that acid water/alkaline water contacts the membrane surface sufficiently, and the foulants are removed more thoroughly.

3. The filter device can perform a static washing, a dynamic washing, and a static-dynamic combined washing of the reverse osmosis membrane, wherein the static washing can soak the reverse osmosis membrane such that acid water or alkaline water interacts with the reverse osmosis membrane more thoroughly; in the static-dynamic combined state, gases generated by an electrolytic reaction in the filter device can be discharged from the filter device; and in the dynamic washing state, the washing effect is better.

4. Both the first electrode and the second electrode can be integrated onto the support, so as to reduce the volume and the mounting difficulty of the filter device.

BRIEF DESCRIPTION OF THE DRAWINGS

The accompanying drawings described herein are merely for the purpose of explanation, and not intended to limit the scope disclosed by the present disclosure in any way. In addition, the shapes and proportional dimensions of components in the accompanying drawings are only illustrative for facilitating understanding the present disclosure, rather than specifically defining the shapes and proportional dimensions of components of the present disclosure. Being taught by the present disclosure, a person skilled in the art can implement the present disclosure by selecting various possible shapes and proportional dimensions depending on the specific circumstances.

Figure 1A:
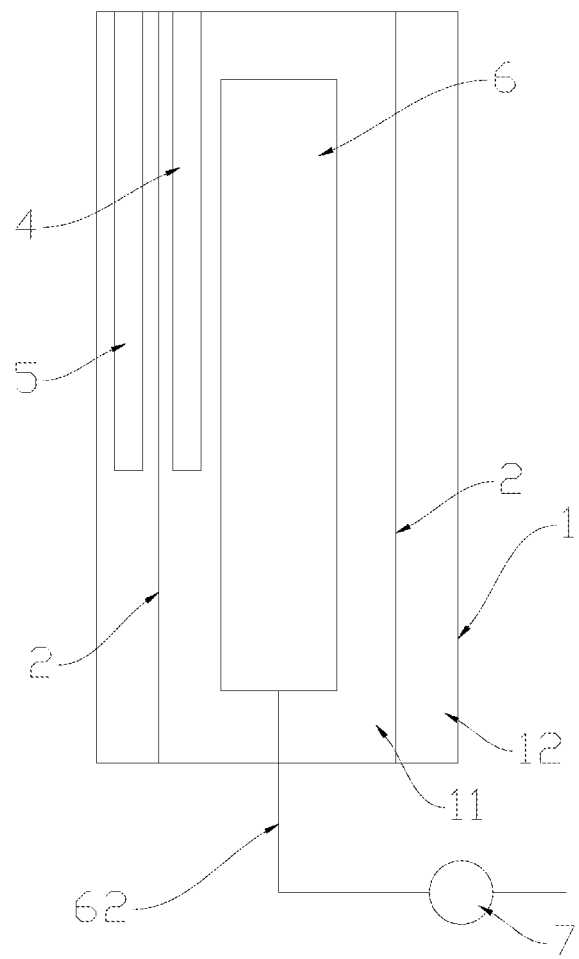
FIG. 1A illustrates a structure diagram of a filter device according to an embodiment of the present disclosure.

The reference numerals in the above accompanying drawings are as follows.

1: membrane housing; 11: first chamber; 12: second chamber; 13: body; 14: upper cover; 15: lower cover; 2: spacer; 21: support; 22: membrane; 3: direct current power supply; 4: first electrode; 5: second electrode; 6: membrane element; 61: pure water outlet; 62: wastewater outlet; 7: flow valve; 81: first throttling device; 82: second throttling device; 9: drain line.

DETAILED DESCRIPTION OF THE PREFERRED EMBODIMENTS

The accompanying drawings and the description of the embodiments of the present disclosure can be referenced to understand the details of the present disclosure more clearly. However, the embodiments of the present disclosure described herein are only used for the purpose of explaining the present disclosure, and cannot be understood as limitations to the present disclosure in any way. Being taught by the present disclosure, a person skilled in the art can conceive of any possible modification based on the present disclosure, which shall be regarded as falling within the scope of the present disclosure.

Figure 1B:
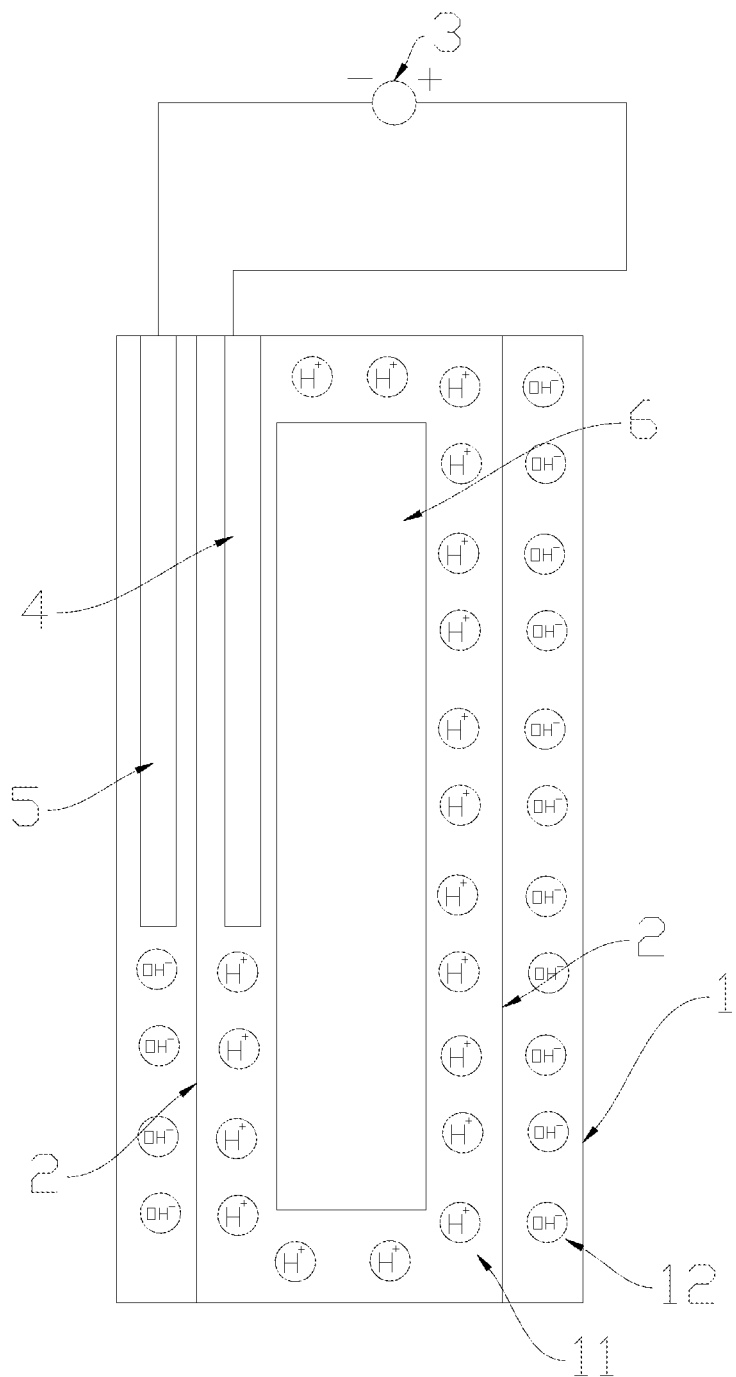
FIG. 1B illustrates a structure principle diagram of the filter device of FIG. 1A in an acid washing state.
Figure 1C:
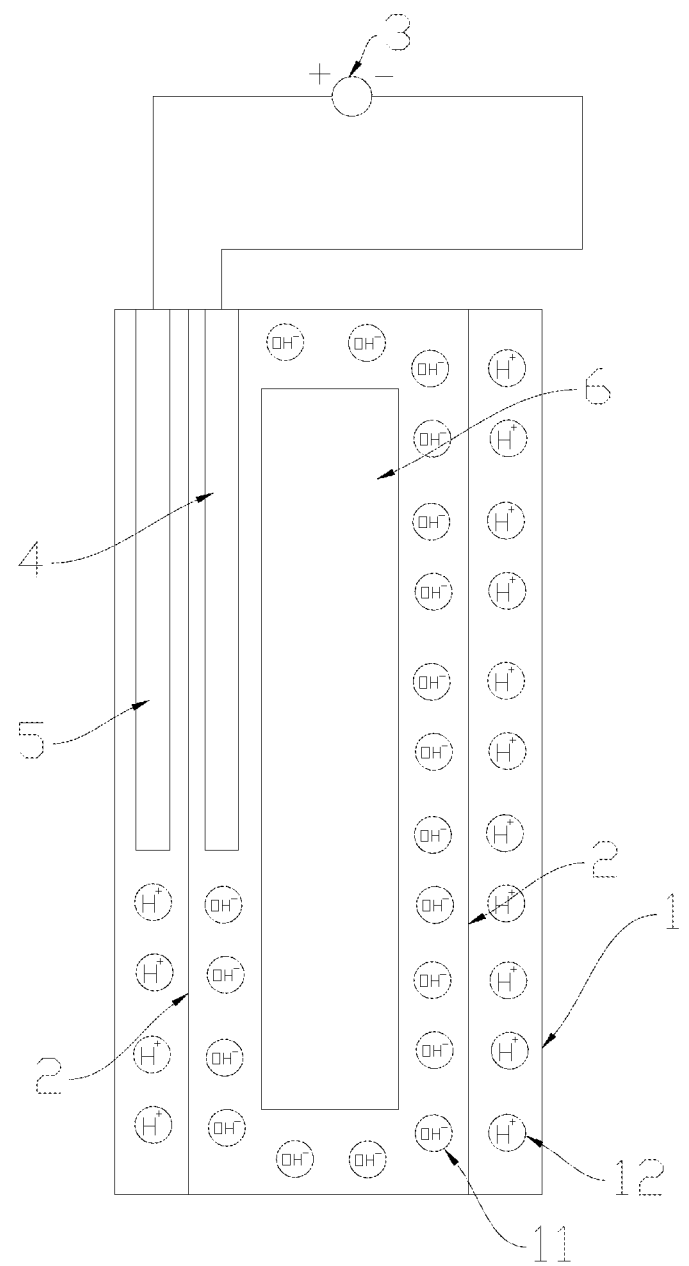
FIG. 1C illustrates a structure principle diagram of the filter device of FIG. 1A in an alkaline washing state.

FIGS. 1A to 1C illustrate a structure diagram of a filter device according to an embodiment of the present disclosure. As illustrated in FIG. 1A, the filter device comprises a membrane housing 1, a spacer 2, a membrane element 6, a first electrode 4, and a second electrode 5. The spacer 2 separates the membrane housing 1 into a first chamber 11 and a second chamber 12. The membrane element 6 is disposed in the first chamber 11. The first electrode 4 is disposed in the first chamber 11. The second electrode 5 is disposed in the second chamber 12.

Figure 3:
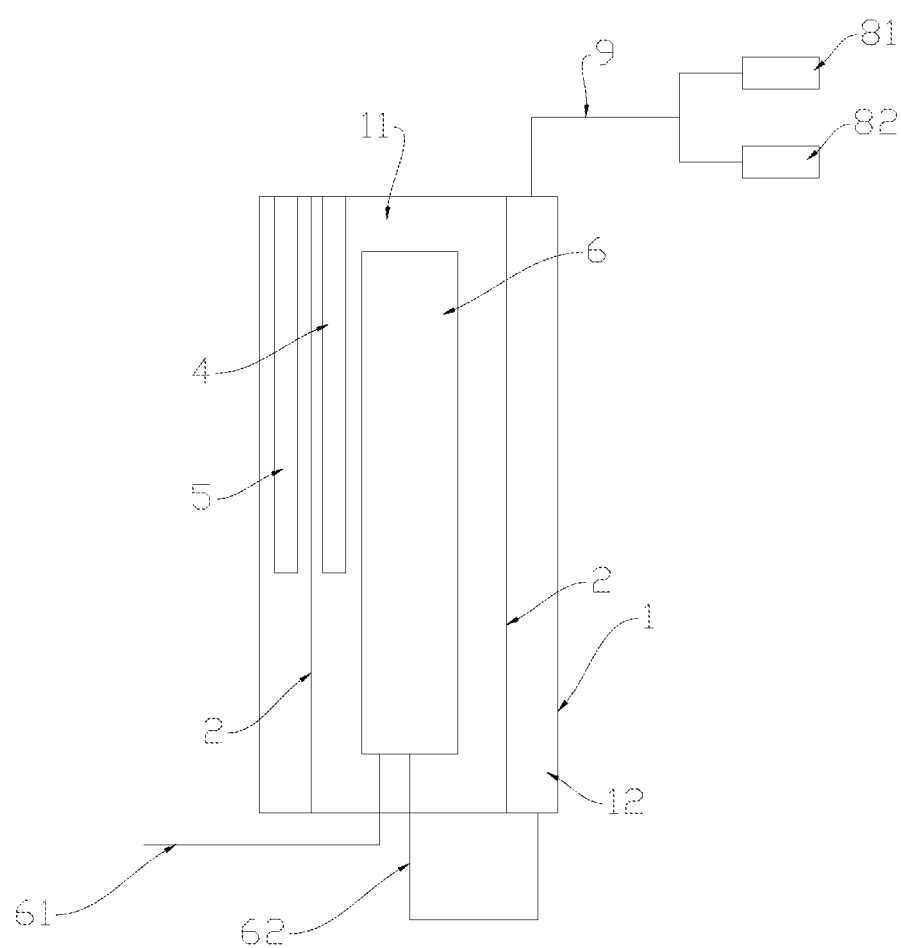
FIG. 3 illustrates a structure diagram of a filter device according to still another embodiment of the present disclosure.

Specifically, the membrane housing 1 has a substantially hollow cylinder shape with an inner chamber. The spacer 2 also has a substantially hollow cylinder shape. The spacer 2 is disposed in the membrane housing 1 so as to separate the membrane housing 1 into the first chamber 11 and the second chamber 12. The first chamber 11 and the second chamber 12 can be filled with water. The membrane element 6 is located in the first chamber 11 to filter a water source entering the first chamber 11. As illustrated in FIG. 3, the membrane element 6 comprises a water inlet, a pure water outlet 61, and a wastewater outlet 62. The water inlet of the membrane element 6 is in communication with the first chamber 11. The pure water outlet 61 and the wastewater outlet 62 of the membrane element 6 can protrude out of the membrane housing 1, such that water flows to different pipes. The water inlet of the membrane element 6 is located on a side surface of the membrane element 6, the wastewater outlet is located on an end surface of the membrane element 6, and the pure water outlet 61 of the membrane element 6 is in communication with a water collecting pipe. The wastewater outlet 62 of the membrane element 6 is located adjacent to the water collecting pipe of the membrane element 6. The first electrode 4 and the second electrode 5 of the membrane element 6 are disposed in the first chamber 11 and the second chamber 12, respectively, i.e., the first electrode 4 and the second electrode 5 are located at opposite sides of the spacer 2. The spacer 2 has a predetermined ion transmittance, and the first electrode 4 and the second electrode 5 can be connected to two electrodes of the power supply, respectively; and when the first chamber 11 and the second chamber 12 are filled with water, an electrolytic cell is formed between the first electrode 4 and the second electrode 5. In a case where the first electrode 4 and the second electrode 5 are connected to positive and negative electrodes of a direct current power supply 3, respectively, the power is turned on and an electrolysis is performed during washing, whereby acid water or alkaline water is generated near the two electrodes, respectively, so as to perform an acid washing or an alkaline washing of the reverse osmosis membrane. As illustrated in FIG. 1B, the filter device is in an acid washing state in which the first electrode 4 is connected to the positive electrode of the direct current power supply 3, and the second electrode 5 is connected to the negative electrode of the direct current power supply 3, so as to accumulate H+ in the first chamber 11, and accumulate OH− in the second chamber 12. When H+ in the first chamber 11 is accumulated to a certain degree, water within the first chamber 11 is correspondingly acid. As an accumulation degree of H+ in the first chamber 11 increases, a PH value in the first chamber 11 decreases. The acid water within the first chamber 11 reacts with inorganic salt foulants remained in the membrane element 6 to remove the inorganic salt foulants, thereby achieving the purpose of washing the membrane element 6.

As illustrated in FIG. 1C, the filter device is in an alkaline washing state in which the first electrode 4 is connected to the negative electrode of the direct current power supply 3, and the second electrode 5 is connected to the positive electrode of the direct current power supply 3, so as to accumulate OH− in the first chamber 11, and accumulate H+ in the second chamber 12. When OH− in the first chamber 11 is accumulated to a certain degree, water within the first chamber 11 is correspondingly alkaline. As an accumulation degree of OH− in the first chamber 11 increases, a PH value in the first chamber 11 increases. The alkaline water within the first chamber 11 reacts with organic salt foulants remained in the membrane element 6 to remove the organic salt foulants, thereby achieving the purpose of washing the membrane element 6.

In order to remove both the organic and inorganic salt foulants in the membrane element 6, the filter device may have an acid cleaning state and an alkaline cleaning state that take place in the alternative manner. Based on the actual condition and demand, the filter device may first perform an acid washing and then perform an alkaline washing, i.e., first, the first electrode 4 is connected to the positive electrode of the direct current power supply 3, and the second electrode 5 is connected to the negative electrode of the direct current power supply 3; after the acid washing is completed, the first electrode 4 is connected to the negative electrode of the direct current power supply 3, and the second electrode 5 is connected to the positive electrode of the direct current power supply 3. Of course, the filter device may also first perform the alkaline washing and then perform the acid washing, which is omitted herein.

The water inlet of the rolled membrane element 6 is located on the side surface of the membrane element 6, and the wastewater outlet 62 is located on an end surface of the membrane element 6 and close to the water collecting pipe of the membrane element 6. The wastewater outlet 62 is at the other end of the membrane. During washing, the acid water/alkaline water flows through the entire membrane surface from the water inlet of the membrane element 6, and flows out of the membrane element 6 from the wastewater outlet 62. The acid water/alkaline water sufficiently contacts the membrane surface, and the foulants are removed more thoroughly.

The wastewater outlet 62 of the membrane element 6 may be provided with a flow rate control device having at least a filtration flow rate state and a washing flow rate state, wherein a filtration flow rate is larger than a washing flow rate. When the filter device is in a filtering state, the flow rate control device is in the filtration flow rate state, and when the filter device is in a washing state, the flow rate control device in the washing flow rate state. In this embodiment, the flow rate control device may be a flow valve 7. The flow valve 7 can control a liquid flow rate at the wastewater outlet 62 of the membrane element 6. When the filter device is in the filtering state, the flow valve 7 may control the liquid flow rate at the wastewater outlet 62 of the membrane element 6 to be a large flow rate, so as to reduce the time required for water to pass through the membrane element 6, and improve the filtering efficiency of the filter device. When the filter device is in the washing state, the flow valve 7 may control the liquid flow rate at the wastewater outlet 62 of the membrane element 6 to be a small flow rate, so as to reduce the flow rate at the wastewater outlet 62 of the membrane element 6, increase the time required for the acid water/alkaline water to pass through the membrane element 6, and prolong the time required for the acid water/alkaline water to stay in the membrane element 6, such that the acid water/alkaline water can sufficiently resolve the inorganic/organic salt foulants to improve the washing efficiency of the filter device.

Tests show that when the filter device is in the acid washing state, water within the first chamber 11 has a PH value of 1 to 4, and when the filter device is in the alkaline washing state, water within the first chamber 11 has a PH value of 9 to 13.

As shown in the following Table 1, water within the first chamber 11 in the static washing state has a wide range of the PH value, which is more suitable for the combination of the inorganic and organic salt foulants.

TABLE 1

| Voltage | 10 min | | | 20 min | | | 30 min | | |
| --- | --- | --- | --- | --- | --- | --- | --- | --- | --- |
| | Anode PH | Cathode PH | Current/mA | Anode PH | Cathode PH | Current/mA | Anode PH | Cathode PH | Current/mA |
| 12 V | 4 | 10.8 | 450-150 | 3.5 | 11.6 | 420-80 | 3.4 | 12.2 | 430-80 |
| 24 V | 3.3 | 11.4 | 1120-160 | 3.1 | 11.8 | 1140-140 | 2.9 | 12.6 | 1120-120 |

Figure 2A:
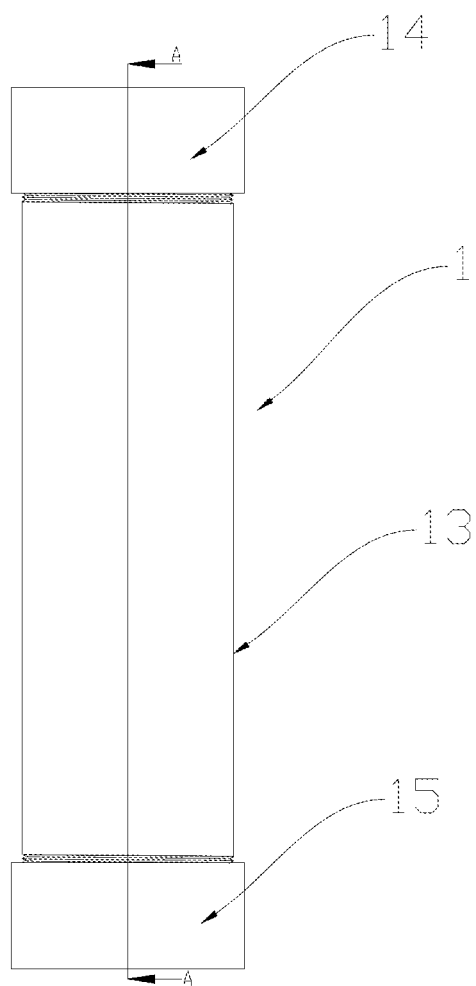
FIG. 2A illustrates a structure diagram of a filter device according to another embodiment of the present disclosure.
Figure 2B:
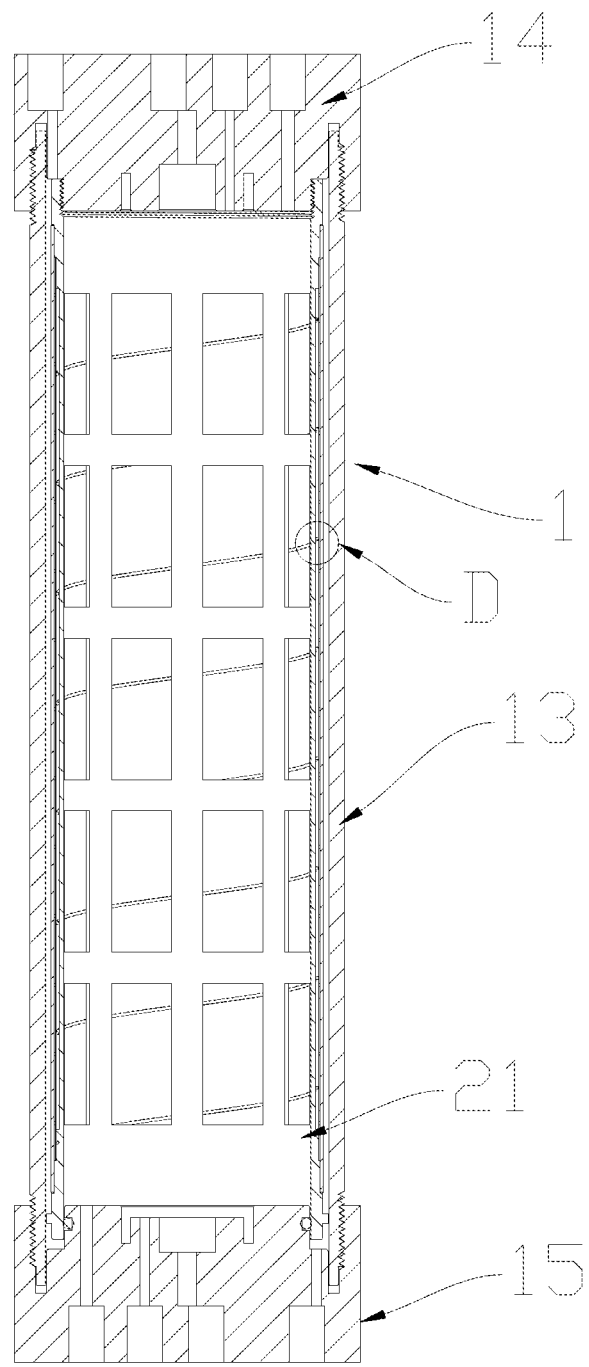
FIG. 2B illustrates a sectional view along A-A direction in FIG. 2A.
Figure 2C:
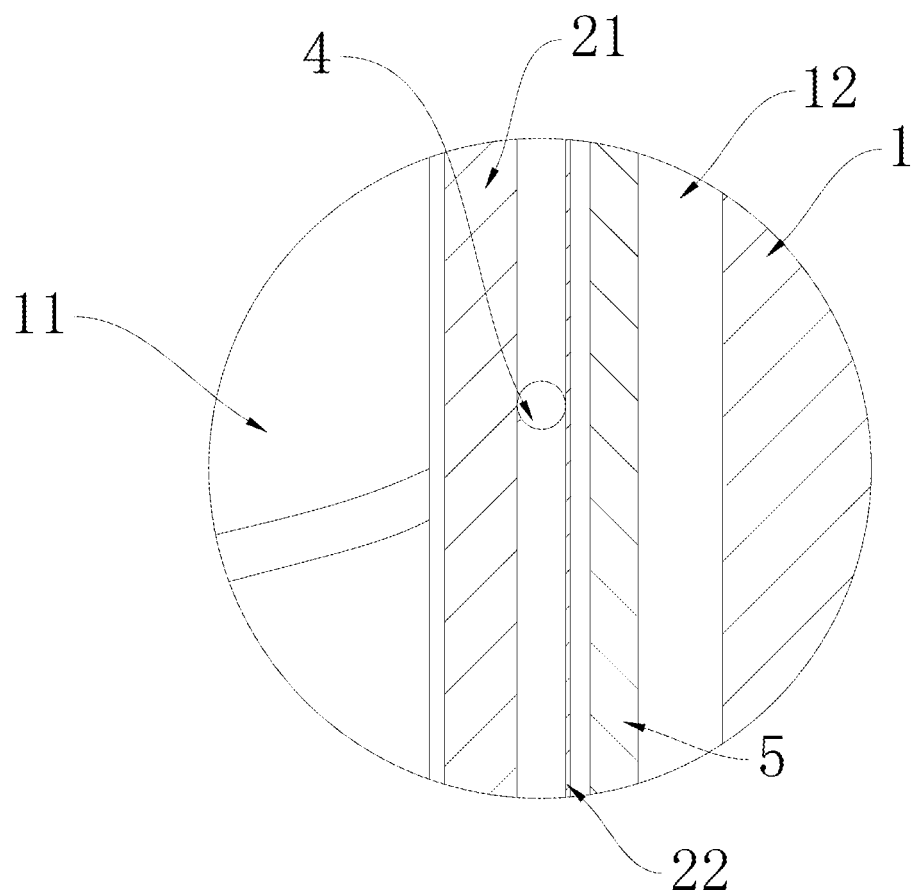
FIG. 2C illustrates a partial enlarged diagram of Part D in FIG. 2B.

FIGS. 2A to 2C illustrate a structure diagram of a filter device according to another embodiment of the present disclosure. As illustrated in FIG. 2A, the membrane housing 1 may comprise a cylindrical body 13, an upper cover 14 disposed at an upper end of the body 13, and a lower cover 15 disposed at a lower end of the body 13. As illustrated in FIGS. 2B and 2C, the spacer 2 in the filter device may comprise a support 21 and a membrane 22. The support 21 may be provided with one or more through holes. The membranes 22 may be correspondingly disposed at the through hole to block the through holes. The support 21 may be made of an insulating material such as plastics. The membrane 22 may be made of a material having an ion transmittance, such as one or more of an ultrafiltration membrane, a nanofiltration membrane, a reverse osmosis membrane, an ion exchange membrane, and a bipolar membrane. In a preferred embodiment, for the convenience of mounting, the membrane 22 may be rolled and fixed on an inner surface or an outer surface of the support 21. The first electrode 4 and the second electrode 5 may be fixedly connected to the support 21, respectively, wherein the first electrode 4 may be disposed on the inner surface of the support 21, and the second electrode 5 may be disposed on the outer surface of the support 21.

FIG. 3 illustrates a structure diagram of a filter device according to still another embodiment of the present disclosure. As illustrated in FIG. 3, the wastewater outlet 62 of the membrane element 6 may also be in communication with the second chamber 12, such that the first chamber 11 is in communication with the second chamber 12. When the filter device is in the filtering state, wastewater generated by a filtration of the membrane element 6 can enter the second chamber 12. When the filter device is in the washing state, water entering the first chamber 11 flows into the membrane element 6 from the water inlet thereof, flows out of the membrane element 6 from the wastewater outlet 62 thereof and enters the second chamber 12, so as to accumulate positive and negative ions in the first chamber 11 and the second chamber 12, respectively, by means of the first electrode 4 in the first chamber 11 and the second electrode 5 of the second chamber 12, respectively. With this structure, it is unnecessary to communicate the second chamber 12 with the water source, so that the setting of the waterway is simple, and the control logic of the waterway is easy. As illustrated in FIG. 3, the wastewater outlet 62 of the membrane element 6 may protrude out of a lower end of the membrane housing 1 and be communicated with a lower portion of the second chamber 12, while the water outlet of the second chamber 12 may be located at an upper portion of the second chamber 12. Therefore, the volume of the filter device can be reduced by using this structure.

The filter device in this embodiment may adopt a dynamic washing method, i.e., water generated by a filtration of the membrane element 6 may be discharged to the outside from the second chamber 12, so as to flush the membrane element 6. In this process, gases generated by an electrolytic reaction may also be discharged from the filter device.

In this embodiment, the filter device further comprises means for opening and closing the wastewater outlet 62, so as to achieve a static washing, a dynamic washing, and a static-dynamic combined washing. The static washing is a closed washing mode in which water is not discharged to the outside during the washing. In the static washing process, the opening and closing means close the wastewater outlet, and statically retain an acid solution or an alkaline solution in a raw water flow channel for a certain time, so as to soak the membrane element 6. The dynamic washing is an open washing mode in which water is discharged to the outside during the washing. In a dynamic washing process, the opening and closing means are opened such that the wastewater outlet can be communicated with the outside. Of course, the opening and closing means may also be controlled to be opened and closed, so as to achieve the static-dynamic combined washing state.

In a preferred embodiment, the second chamber 12 may comprise a water outlet in communication with a drain line 9, so as to discharge wastewater therein from the second chamber 12. A flow rate control device is in communication with the water outlet of the second chamber 12. The flow rate control device may comprise at least two throttling devices. The rated flow rate of a first throttling device 81 is a large filtration flow rate, and the rated flow rate of a second throttling device 82 is a small washing flow rate. The first throttling device 81 and the second throttling device 82 are disposed in parallel.

When the filter device is in the filtering state, the first throttling device 81 is in communication with the water outlet of the second chamber 12, so as to achieve a large liquid flow rate at the wastewater outlet 62 of the membrane element 6. When the filter device is in the washing state, the second throttling device 82 is in communication with the water outlet of the second chamber 12, so as to achieve a small liquid flow rate at the membrane element 6, so as to increase the time for water to pass through the membrane element 6, prolong the time for water to stay in the membrane element 6, and improve the washing efficiency of the filter device. In this embodiment, the throttling devices may be wastewater proportioners, wherein the first throttling device 81 has a water flux of 1.5 L/MIN, and the second throttling device 82 has a water flux of 100 ML/MIN. Of course, in other embodiments, the throttling devices may also be any other devices having a throttling effect such as capillary tubes.

In this embodiment, when the filter device is in the washing state, a breakover current between the first electrode 4 and the second electrode 5 may be 0 to 3 A, and the direct current power supply 3 may have a voltage of 0 to 36 V.

The present disclosure further discloses a method for washing the filter device, comprising: connecting positive and negative electrodes of a direct current power supply 3 to the first electrode 4 located within the first chamber 11 and the second electrode 5 located within the second chamber 12, respectively, such that the first electrode 4 and the second electrode 5, water within the first chamber 11, and water within the second chamber 12 form an electrolytic cell, thereby generating acid water or alkaline water within the first chamber 11.

When the first electrode 4 is electrically connected to the positive electrode of the direct current power supply 3, and the second electrode 5 is electrically connected to the negative electrode of the direct current power supply 3, acidic liquid may be formed within the first chamber 11.

When the first electrode 4 is electrically connected to the negative electrode of the direct current power supply 3, and the second electrode 5 is electrically connected to the positive electrode of the direct current power supply 3, alkaline liquid may be formed within the first chamber 11.

In a preferred embodiment, the filter device may have an acid washing state and an alkaline washing state that take place in the alternative manner. For example, after an alkaline washing is completed, an acid washing may be performed, i.e., the first electrode 4 may be electrically connected to the negative electrode of the direct current power supply 3, and the second electrode 5 may be electrically connected to the positive electrode of the direct current power supply 3, so as to form alkaline liquid within the first chamber 11, and achieve the alkaline washing state; the first electrode 4 may be electrically connected to the positive electrode of the direct current power supply 3, and the second electrode 5 may be electrically connected to the negative electrode of the direct current power supply 3, so as to form acidic liquid within the first chamber 11, and achieve the acid washing state.

For another example, after an acid washing is completed, an alkaline washing may be performed, i.e., the first electrode 4 may be electrically connected to the positive electrode of the direct current power supply 3, and the second electrode 5 may be electrically connected to the negative electrode of the direct current power supply 3, so as to form acidic liquid within the first chamber 11, and achieve the acid washing state; the first electrode 4 may be electrically connected to the negative electrode of the direct current power supply 3, and the second electrode 5 may be electrically connected to the positive electrode of the direct current power supply 3, so as to form alkaline liquid within the first chamber 11, and achieve the alkaline washing state.

In a preferred embodiment, when the filter device is in the washing state, a water pump in communication with the first chamber 11 may be turned off, so as to prolong the time required for water entering the membrane element 6 to pass through the membrane element 6, and improve the washing efficiency.

In another preferred embodiment, the flow rate of water within the filter device may be further decreased by a flow rate control device in communication with the wastewater outlet 62 of the membrane element 6, so as to prolong the time required for water entering the membrane element 6 to pass through the membrane element 6, and improve the washing efficiency.

In a preferred embodiment, the water inlet of the filter device is in communication with the water source, and the water outlet of the filter device is connected to the drain line 9.

The embodiments herein are all described in a progressive manner, and the contents highlighted in each embodiment are distinctions relative to other embodiments, while the same or similar portions of the embodiments can refer to each other.

The above embodiments are merely used for illustrating the technical concept and features of the present disclosure, with a purpose that a person skilled in the art can acquire the content of the present disclosure and accordingly implement the same, rather than limiting the protection scope of the present disclosure. Any equivalent variation or modification made according to the essential spirit of the present disclosure shall fall within the protection scope of the present disclosure.

The invention claimed is:

1. A filter device for filtering a water source to obtain pure water, comprising:
   a membrane housing;
   a spacer having an ion transmittance, the spacer separating the membrane housing into a first chamber of ions having a first charge and a second chamber of ions having a second charge opposite the first charge;
   a membrane element for filtration disposed in the first chamber, the membrane element having a water inlet, a pure water outlet and a wastewater outlet, the water inlet being in contact with the first chamber, and the first chamber being in contact with the water source;
   a first electrode disposed in the first chamber; and
   a second electrode disposed in the second chamber;
   wherein the filter device includes a washing state in which the first electrode and the second electrode are connected to positive and negative electrodes of a direct current power supply such that water within the first chamber is acidic or alkaline, the washing state being used for washing the membrane element.

2. The filter device according to claim 1, wherein the first electrode and the second electrode are connected to two electrodes of a power supply, respectively; and when the first chamber and the second chamber are filled with water, an electrolytic cell is formed between the first electrode and the second electrode.

3. The filter device according to claim 1, wherein the spacer comprises a support provided with a through hole and a membrane for blocking the through hole, the membrane having the ion transmittance.

4. The filter device according to claim 3, wherein the support is in a sleeve shape, and the membrane is wound inside or outside the support.

5. The filter device according to claim 3, wherein the first electrode is disposed on an inner surface of the support.

6. The filter device according to claim 3, wherein the second electrode is disposed on an outer surface of the support.

7. The filter device according to claim 3, wherein the membrane comprises one or more of an ultrafiltration membrane, a nanofiltration membrane, a reverse osmosis membrane, an ion exchange membrane, and a bipolar membrane.

8. The filter device according to claim 1, wherein the filter device has an acid washing state in which the first electrode is connected to the positive electrode of the direct current power supply, and the second electrode is connected to the negative electrode thereof.

9. The filter device according to claim 8, wherein when the filter device is in the acid washing state, water within the first chamber has a pH value of 1 to 4.

10. The filter device according to claim 1, wherein the filter device has an alkaline washing state in which the first electrode is connected to the negative electrode of the direct current power supply, and the second electrode is connected to the positive electrode thereof.

11. The filter device according to claim 10, wherein when the filter device is in the alkaline washing state, water within the first chamber has a pH value of 9 to 13.

12. The filter device according to claim 1, wherein the filter device has an acid washing state and an alkaline washing state that take place in alternation, wherein when the filter device is in the acid washing state, the first electrode is connected to the positive electrode of the direct current power supply, and the second electrode is connected to the negative electrode thereof; when the filter device in the alkaline washing state, the first electrode is connected to the negative electrode of the direct current power supply, and the second electrode is connected to the positive electrode thereof.

13. The filter device according to claim 1, characterized in that, when the filter device is in the washing state, a breakover current between the first electrode and the second electrode is 0 to 3 A.

14. The filter device according to claim 1, wherein when the filter device is in the washing state, the direct current power supply has a voltage of 0 to 36 V.

15. The filter device according to claim 1, wherein the wastewater outlet is in contact with the second chamber and the second chamber is in contact with a drain line.

16. The filter device according to claim 15, wherein the wastewater outlet of the membrane element is provided with a flow rate control device having at least a filtration flow rate state and a washing flow rate state, a filtration flow rate in the filtration flow rate state being larger than a washing flow rate in the washing flow rate state, and wherein when the filter device is in a filtering state, the flow rate control device is in the filtration flow rate state, and when the filter device is in the washing state, the flow rate control device in the washing flow rate state.

17. The filter device according to claim 16, wherein the filter device further comprises a switching device for opening and closing the wastewater outlet.

18. The filter device according to claim 16, wherein the second chamber has a water outlet in contact with the flow rate control device.

19. The filter device according to claim 16, wherein the flow rate control device comprises first and second throttling devices in communication with the wastewater outlet of the membrane element and connected in parallel with each other, a flow rate of the first throttling device being the filtration flow rate and a flow rate of the second throttling device being the washing flow rate.

20. The filter device according to claim 1, characterized in that, the membrane element is a rolled reverse osmosis membrane, the water inlet of the membrane element is located on a side surface of the membrane element, and the wastewater outlet of the membrane element is located at an end surface of the membrane element.

21. The filter device according to claim 20, wherein, the wastewater outlet of the membrane element is located adjacent to a water collecting pipe of the membrane element.

22. A method for washing a filter device that is adapted for filtering a water source to obtain pure water, the method comprising:
separating a membrane housing with a spacer to define a first chamber of ions having a first charge on one side of the spacer and a second chamber of ions having a second charge opposite the first charge on an opposite side of the spacer;

disposing a membrane element for filtration in the first chamber, the membrane element having a water inlet, a pure water outlet and a wastewater outlet, the water inlet being in contact with the first chamber, and the first chamber being in contact with the water source;

connecting positive and negative electrodes of a direct current power supply to a first electrode located within the first chamber and a second electrode located within the second chamber, respectively, to form an electrolytic cell, whereby acid water or alkaline water is electrolytically generated within the first chamber; and washing the membrane element with the acid or alkaline water in a washing state of the filter device.

23. The washing method according to claim 22, comprising:
electrically connecting the first electrode with the positive electrode of the direct current power supply, and electrically connecting the second electrode with the negative electrode thereof, such that acidic liquid is formed within the first chamber.

24. The washing method according to claim 22, comprising:
electrically connecting the first electrode with the negative electrode of the direct current power supply, and electrically connecting the second electrode with the positive electrode thereof, such that alkaline liquid is formed within the first chamber.

25. The washing method according to claim 22, comprising:
electrically connecting the first electrode with the negative electrode of the direct current power supply, and electrically connecting the second electrode with the positive electrode thereof, such that alkaline liquid is formed within the first chamber; and electrically connecting the first electrode with the positive electrode of the direct current power supply, and electrically connecting the second electrode with the negative electrode thereof, such that acidic liquid is formed within the first chamber.

26. The washing method according to claim 22, comprising: closing a water pump in communication with the first chamber.

27. The washing method according to claim 26, comprising: communicating the water inlet of the membrane element with the water source, and connecting the wastewater outlet of the membrane element to a drain line.

28. The washing method according to claim 27, in comprising: reducing a flow rate of water within the filter device by a flow rate control device in communication with the wastewater outlet of the membrane element.

29. The filter device according to claim 1, wherein the membrane housing is cylindrical and the spacer is cylindrical and positioned within the cylindrical membrane housing, and the first chamber is inside the spacer and the second chamber is outside the spacer.

* * * * *